US010586965B2

(12) United States Patent
Yen (10) Patent No.: US 10,586,965 B2
(45) Date of Patent: Mar. 10, 2020

(54) MICROPOROUS SHEET PRODUCT AND METHODS FOR MAKING AND USING THE SAME

(71) Applicant: William Winchin Yen, Acton, MA (US)

(72) Inventor: William Winchin Yen, Acton, MA (US)

(*) Notice: Subject to any disclaimer, the term of this patent is extended or adjusted under 35 U.S.C. 154(b) by 229 days.

(21) Appl. No.: 15/328,100

(22) PCT Filed: Nov. 4, 2015

(86) PCT No.: PCT/US2015/058960
§ 371 (c)(1),
(2) Date: Jan. 23, 2017

(87) PCT Pub. No.: WO2016/012273
PCT Pub. Date: Jan. 28, 2016

(65) Prior Publication Data
US 2017/0214021 A1    Jul. 27, 2017

Related U.S. Application Data

(60) Provisional application No. 62/075,501, filed on Nov. 5, 2014.

(51) Int. Cl.
*B32B 3/26* (2006.01)
*B32B 3/28* (2006.01)
(Continued)

(52) U.S. Cl.
CPC ...... *H01M 2/1653* (2013.01); *B01D 67/0013* (2013.01); *B01D 67/0027* (2013.01);
(Continued)

(58) Field of Classification Search
CPC ... H01M 2/1653; H01M 2/162; B32B 27/325; B32B 27/205; B32B 27/304; B32B 27/327; B32B 2457/10; C08J 5/18
See application file for complete search history.

(56) References Cited

U.S. PATENT DOCUMENTS

| 2,806,256 A | 9/1957 | Smith-Johannsen |
| 3,351,495 A | 11/1967 | Larsen et al. |
| (Continued) | | |

FOREIGN PATENT DOCUMENTS

| CN | 1972986 A | 5/2007 |
| CN | 101267934 A | 9/2008 |
| (Continued) | | |

OTHER PUBLICATIONS

Baldwin, "A Review of State-of-the-Art Separator Materials for Advanced Lithium-Based Batteries for Future Aerospace Missions," NASA/TM-2009-215590, http://ntrs.nasa.gov/archive/nasa/casi.ntrs.nasa.gov/20090017842.pdf (2009).
(Continued)

*Primary Examiner* — Hai Vo
(74) *Attorney, Agent, or Firm* — Kriegsman & Kriegsman (57) ABSTRACT

Microporous sheet product and methods of making and using the same. In one embodiment, the microporous sheet product is made by a process that includes melt-extruding a sheet material using an extrusion mixture that includes (i) a cyclic olefin copolymer, (ii) an electrolyte swellable thermoplastic, and (iii) a compatibilizing agent that promotes mixing of the cyclic olefin copolymer and the electrolyte swellable thermoplastic, the compatibilizing agent having a boiling point in the range of 135-300° C. As an example, the cyclic olefin copolymer may be an ethylene-norbornene copolymer, the electrolyte swellable thermoplastic may be polyethylene oxide, and the compatibilizing agent may be mineral spirits. After extrusion, the sheet material may be (Continued)

cooled, and the compatibilizing agent may be removed, forming an ionically-conductive microporous sheet product. The microporous sheet product has high-temperature stability and gels when exposed to a liquid electrolyte, enabling high ionic conductivity when used as a battery separator.

45 Claims, 2 Drawing Sheets

(51) Int. Cl.
  B32B 5/02 (2006.01)
  B32B 7/02 (2019.01)
  B32B 7/12 (2006.01)
  B32B 9/00 (2006.01)
  B32B 9/04 (2006.01)
  C08J 5/18 (2006.01)
  H01M 2/14 (2006.01)
  H01M 2/16 (2006.01)
  B01D 67/00 (2006.01)
  B01D 71/26 (2006.01)
  B32B 23/04 (2006.01)
  B32B 23/08 (2006.01)
  B32B 27/08 (2006.01)
  B32B 27/12 (2006.01)
  B32B 27/20 (2006.01)
  B32B 27/28 (2006.01)
  B32B 27/30 (2006.01)
  B32B 27/32 (2006.01)
  B32B 27/24 (2006.01)
  B65B 25/00 (2006.01)
  C08J 9/00 (2006.01)

(52) U.S. Cl.
  CPC .............. *B01D 71/26* (2013.01); *B32B 27/08* (2013.01); *B32B 27/205* (2013.01); *B32B 27/24* (2013.01); *B32B 27/304* (2013.01); *B32B 27/308* (2013.01); *B32B 27/325* (2013.01); *B65B 25/001* (2013.01); *C08J 5/18* (2013.01); *B01D 2323/16* (2013.01); *B01D 2325/34* (2013.01); *C08J 9/0066* (2013.01); *C08J 2301/02* (2013.01); *C08J 2323/08* (2013.01); *C08J 2327/12* (2013.01); *C08J 2333/08* (2013.01); *C08J 2371/02* (2013.01); *C08J 2400/22* (2013.01)

(56) References Cited

U.S. PATENT DOCUMENTS

| | | |
|---|---|---|
| 3,407,253 A | 10/1968 | Yoshimura et al. |
| 3,426,754 A | 2/1969 | Bierenbaum et al. |
| 3,512,997 A | 5/1970 | Cohly et al. |
| 3,558,764 A | 1/1971 | Isaacson et al. |
| 3,679,538 A | 7/1972 | Druin et al. |
| 3,679,540 A | 7/1972 | Zimmerman et al. |
| 3,801,404 A | 4/1974 | Druin et al. |
| 3,843,761 A | 10/1974 | Bierenbaum et al. |
| 3,920,588 A | 11/1975 | Traeubel et al. |
| 3,967,978 A | 7/1976 | Honda et al. |
| 4,024,323 A | 5/1977 | Versteegh |
| 4,100,324 A | 7/1978 | Anderson et al. |
| 4,138,459 A | 2/1979 | Brazinsky et al. |
| 4,210,709 A | 7/1980 | Doi |
| 4,224,394 A | 9/1980 | Schmidt |
| 4,247,498 A | 1/1981 | Castro |
| 4,279,979 A | 7/1981 | Benson et al. |
| 4,283,442 A | 8/1981 | Machi et al. |
| 4,285,751 A | 8/1981 | Feinberg et al. |
| 4,287,276 A | 9/1981 | Lundquist, Jr. et al. |
| 4,288,503 A | 9/1981 | Goldberg |
| 4,330,602 A | 5/1982 | O'Rell et al. |
| 4,346,142 A | 8/1982 | Lazear |
| 4,427,737 A | 1/1984 | Cilento et al. |
| 4,522,902 A | 6/1985 | Minchak et al. |
| 4,539,256 A | 9/1985 | Shipman |
| 4,614,575 A | 9/1986 | Juda et al. |
| 4,650,730 A | 3/1987 | Lundquist et al. |
| 4,699,857 A | 10/1987 | Giovannoni et al. |
| 4,774,155 A | 9/1988 | Nientiedt et al. |
| 4,833,172 A | 5/1989 | Schwarz et al. |
| 4,873,037 A | 10/1989 | Chau et al. |
| 4,948,544 A | 8/1990 | Van Unen et al. |
| 4,957,943 A | 9/1990 | McAllister et al. |
| 4,994,335 A | 2/1991 | Kamaei et al. |
| 5,051,183 A | 9/1991 | Takita et al. |
| 5,217,649 A | 6/1993 | Kulkarni et al. |
| 5,240,655 A | 8/1993 | Troffkin et al. |
| 5,281,491 A | 1/1994 | Rein et al. |
| 5,328,760 A | 7/1994 | Gillberg-LaForce |
| 5,336,573 A | 8/1994 | Zuckerbrod et al. |
| 5,478,677 A | 12/1995 | Choi et al. |
| 5,503,791 A | 4/1996 | Fortuin et al. |
| 5,641,562 A | 6/1997 | Larson et al. |
| 5,641,565 A | 6/1997 | Sogo |
| 5,830,554 A | 11/1998 | Kaimai et al. |
| 5,865,926 A | 2/1999 | Wu et al. |
| 5,922,417 A | 7/1999 | Singleton et al. |
| 5,939,181 A | 8/1999 | Kumano et al. |
| 5,942,587 A * | 8/1999 | Arjunan ............... C08F 210/02 526/281 |
| 5,948,557 A | 9/1999 | Ondeck et al. |
| 5,955,187 A | 9/1999 | McCormack et al. |
| 5,962,161 A | 10/1999 | Zucker |
| 6,001,165 A | 12/1999 | Shibuya et al. |
| 6,011,194 A | 1/2000 | Buglino et al. |
| 6,013,151 A | 1/2000 | Wu et al. |
| 6,025,092 A * | 2/2000 | Doyle ................... C08J 5/2237 204/291 |
| 6,159,634 A | 12/2000 | Yen et al. |
| 6,242,127 B1 | 6/2001 | Paik et al. |
| 6,396,682 B1 | 5/2002 | Kim et al. |
| 6,461,724 B1 * | 10/2002 | Radovanovic ....... B01D 67/003 428/315.5 |
| 6,495,292 B1 | 12/2002 | Yen |
| 6,558,591 B2 | 5/2003 | Calis |
| 6,558,840 B1 | 5/2003 | Hikmet |
| 6,559,195 B1 | 5/2003 | Yamamoto et al. |
| 6,696,524 B2 | 2/2004 | Hausmann |
| 6,726,732 B2 | 4/2004 | Kim et al. |
| 6,730,440 B1 | 5/2004 | Bauer et al. |
| 7,288,316 B2 | 10/2007 | Jester |
| 7,452,624 B2 | 11/2008 | Hatoh et al. |
| 7,479,243 B2 | 1/2009 | Funaoka et al. |
| 7,754,387 B2 | 7/2010 | Harada et al. |
| 7,815,825 B2 | 10/2010 | Funaoka et al. |
| 7,867,649 B2 | 1/2011 | Yamaguchi et al. |
| 7,892,672 B2 | 2/2011 | Nishikawa |
| 8,048,520 B2 | 11/2011 | Hayes et al. |
| 8,079,480 B2 | 12/2011 | Haering et al. |
| 8,092,877 B2 | 1/2012 | Jester et al. |
| 8,129,450 B2 | 3/2012 | Wood et al. |
| 8,133,840 B2 | 3/2012 | Mika et al. |
| 8,216,740 B2 | 7/2012 | Prevoir et al. |
| 8,262,973 B2 | 9/2012 | Lee et al. |
| 8,388,878 B2 | 3/2013 | Parrinello et al. |
| 8,551,641 B2 | 10/2013 | Ahn et al. |
| 8,579,621 B2 | 11/2013 | Sane et al. |
| 8,690,981 B2 | 4/2014 | Mao |
| 8,703,283 B2 | 4/2014 | Goerlitz et al. |
| 8,722,231 B2 | 5/2014 | Brilmyer et al. |
| 8,728,617 B2 | 5/2014 | Benenati et al. |
| 8,728,659 B2 | 5/2014 | Armacanqui et al. |
| 8,748,028 B2 | 6/2014 | Takita et al. |
| 8,778,525 B2 | 7/2014 | Kikuchi et al. |
| 8,859,129 B2 | 10/2014 | Brilmyer et al. |
| 8,993,646 B2 | 3/2015 | Huang |
| 9,159,978 B2 | 10/2015 | Yen |
| 2001/0009716 A1 | 7/2001 | Taguchi et al. |

(56) References Cited

U.S. PATENT DOCUMENTS

| | | | |
|---|---|---|---|
| 2001/0024716 A1 | 9/2001 | Chen et al. | |
| 2003/0124324 A1 | 7/2003 | Langley et al. | |
| 2004/0080068 A1 | 4/2004 | Ooizumi et al. | |
| 2005/0101206 A1 | 5/2005 | McCormack et al. | |
| 2006/0051530 A1 | 3/2006 | Schwarz et al. | |
| 2006/0051648 A1 | 3/2006 | Fujibayashi et al. | |
| 2007/0178324 A1 | 8/2007 | Masuda et al. | |
| 2008/0113259 A1 | 5/2008 | Brilmyer et al. | |
| 2008/0269366 A1 | 10/2008 | Shaffer et al. | |
| 2009/0081543 A1 | 3/2009 | Takita et al. | |
| 2009/0098450 A1 | 4/2009 | Kikuchi et al. | |
| 2009/0142657 A1 | 6/2009 | Yen | |
| 2009/0155430 A1 | 6/2009 | Lee et al. | |
| 2009/0181295 A1 | 7/2009 | Usami et al. | |
| 2009/0233145 A1 | 9/2009 | Takami et al. | |
| 2009/0270552 A1 | 10/2009 | Sugawara | |
| 2009/0280310 A1 | 11/2009 | Nitta et al. | |
| 2010/0015515 A1 | 1/2010 | Takata et al. | |
| 2010/0028758 A1 | 2/2010 | Eaves et al. | |
| 2010/0178544 A1 | 7/2010 | Nishikawa | |
| 2010/0221522 A1 | 9/2010 | Mrozinski | |
| 2011/0081601 A1 | 4/2011 | Weber et al. | |
| 2011/0143185 A1 | 6/2011 | Nishikawa | |
| 2011/0311878 A1* | 12/2011 | Inagaki | C08J 5/2231 429/246 |
| 2012/0015229 A1 | 1/2012 | Ohashi et al. | |
| 2012/0288695 A1 | 11/2012 | Jenkins | |
| 2013/0029126 A1 | 1/2013 | Yen | |
| 2013/0034769 A1 | 2/2013 | Takagi et al. | |
| 2013/0052735 A1 | 2/2013 | DeRosa et al. | |
| 2013/0280584 A1 | 10/2013 | Matsumura | |
| 2013/0287937 A1* | 10/2013 | Joo | B01D 67/0046 427/126.4 |
| 2014/0094076 A1 | 4/2014 | Mrozinski et al. | |
| 2014/0147726 A1 | 5/2014 | Toyoda | |
| 2014/0335421 A1 | 11/2014 | Li et al. | |
| 2015/0005405 A1 | 1/2015 | Ishihara et al. | |
| 2015/0118540 A1 | 4/2015 | Fujiwara et al. | |
| 2015/0207121 A1 | 7/2015 | Frenzel et al. | |
| 2015/0228948 A1 | 8/2015 | Maruyama et al. | |
| 2017/0152359 A1 | 6/2017 | Yen | |
| 2017/0166716 A1 | 6/2017 | Yen | |

FOREIGN PATENT DOCUMENTS

| | | |
|---|---|---|
| CN | 101291788 A | 10/2008 |
| CN | 101356216 A | 1/2009 |
| CN | 101386686 A | 3/2009 |
| CN | 101541534 A | 9/2009 |
| CN | 103213364 A | 7/2013 |
| CN | 10565518 A | 6/2016 |
| EP | 1911352 A1 | 4/2008 |
| EP | 2036699 A1 | 3/2009 |
| EP | 2091347 B1 | 9/2010 |
| EP | 1757653 B1 | 1/2011 |
| EP | 2018407 B1 | 10/2012 |
| EP | 2796187 A1 | 10/2014 |
| EP | 2881163 A1 | 6/2015 |
| GB | 790098 A | 2/1958 |
| GB | 838468 | 6/1960 |
| JP | 2000260413 A | 9/2000 |
| JP | 4371670 B2 | 11/2009 |
| JP | 4746797 B2 | 8/2011 |
| JP | 4746830 B2 | 8/2011 |
| KR | 20080056229 A | 6/2008 |
| WO | 9420995 A2 | 9/1994 |
| WO | 9902585 A1 | 1/1999 |
| WO | 2007117042 A1 | 10/2007 |
| WO | 2008136970 A1 | 11/2008 |
| WO | 2009044227 A1 | 4/2009 |
| WO | 2009051278 A2 | 4/2009 |
| WO | 2009123812 A1 | 10/2009 |
| WO | 2013065738 A2 | 5/2013 |
| WO | 2016028989 A1 | 2/2016 |
| WO | 2016073558 A1 | 5/2016 |
| WO | 2016073580 A1 | 5/2016 |

OTHER PUBLICATIONS

"Battery Innovation: High Power/High Energy," Celgard, http://www.celgard.com/battery-innovation (accessed Sep. 2015).

"Li-ion Battery Materials: Separators," Targray Technology International Inc., http://www.targray.com/li-ion-battery/separators/pe-pp-separators (accessed Sep. 2015).

Brandrup, Polymer Handbook, 1999, John Wiley & Sons, pp. 688-713 (Year: 1999).

Ulbricht, "Advanced functional polymer membranes," Polymer, 47:2217-62 (2006).

Rohatgi et al., "Separator Membrane from Crosslinked Poly(Vinyl Alcohol) and Poly(Methyl Vinyl Ether-alt-Maleic Anhydride)," Nanomaterials, 5:398-414 (Mar. 2015).

Mendelsohn et al., "Fabrication of Microporous Thin Films from Polyelectrolyte Multilayers," Langmuir, 16:5017-23 (2000).

Wu et al., "Novel Microporous Films and Their Composites," Journal of Engineered Fibers and Fabrics, 2(1):49-59 (2007).

Arora et al., "Battery Separators," Chemical Reviews, 104(10):4419-62 (2004).

Abstract for Jeon et al., "Phase Behavior of Polymer/diluent/diluent mixtures and their application to control rnicroporous membrane structure," Journal of Membrane Science, 300(1-2):172-81 (2007).

First page of Oh et al., "Microporous polyolefin film for battery separator," SPE/Antec 2001 Conference Proceedings, Dallas, Texas, vol. 1, p. 354-358.

Polymer Properties Database: Solubility Parameter; http://polymerdatabase.com/polymer%20physics/delta%20Table.html (2015).

Poly(vinylidene fluoride); https://polymerdatabase.com/polymers/polyvinylidenefluoride.html (2015).

* cited by examiner

MICROPOROUS SHEET PRODUCT AND METHODS FOR MAKING AND USING THE SAME

CROSS-REFERENCE TO RELATED APPLICATIONS

The present application claims the benefit under 35 U.S.C. 119(e) of U.S. Provisional Patent Application No. 62/075,501, filed Nov. 5, 2014, the disclosure of which is incorporated herein by reference.

BACKGROUND OF THE INVENTION

The present invention relates generally to microporous sheet products and relates more particularly to a novel microporous sheet product and to methods of making and using the same.

Microporous sheet products are well-known and commonly used articles found in items as diverse as, for example, electrochemical batteries, food packaging materials, and ultrafiltration devices. For example, in electrochemical batteries, microporous sheet products are commonly used as battery separators. Typically, an electrochemical battery includes at least one pair of electrodes of opposite polarity and, in many cases, includes a series of electrode pairs of alternating polarity. The current flow between the electrodes of each pair is maintained by an electrolyte. Depending on the nature of the battery system, the electrolyte may be acidic, alkaline, or substantially neutral, and the battery may a primary or secondary (rechargeable or storage) system. For example, in alkaline storage batteries, which include, but are not limited to, primary, secondary, nickel, zinc and silver cells, the electrolyte is generally an aqueous solution of potassium hydroxide. By contrast, in lead acid batteries, the electrolyte is typically a sulfuric acid solution, and, in lithium storage batteries, the electrolyte is typically an organic solution of lithium salt, such as lithium trifluoromethyl sulfonate, lithium tetrafluoro borate, lithium hexafluorophosphate, or another lithium salt.

A battery separator is typically provided in a battery between adjacent electrodes of opposite polarity to prevent direct contact between the oppositely charged electrode plates since such direct contact would result in a short circuit of the battery. In general, it is highly desirable for the separator to possess one or more of the following qualities: (i) to be thin and lightweight to aid in providing a battery of high energy density and specific energy; (ii) to have a structure that inhibits dendrite formation between the electrode plates; (iii) to have the ability to enhance the uptake of the electrolytic composition over the electrode plates and, in so doing, to promote a substantially uniform distribution of the electrolytic composition over the electrode plates (an effect generally referred to as wicking); (iv) to provide the property of freely permitting electrolytic conduction; and (v) to have a dimensionally stable structure even during thermal excursions (internal or external heating). It is further highly desirable for the separator to be made in an economical and environmentally safe manner while being substantially free of defects, such as pinholes and the like.

Separators of the type that are conventionally used in battery systems are typically made of porous structures that, when placed in an electrolyte or electrolytic system, are capable of exhibiting a high degree of conductivity while being stable to the environment presented by the battery system. The separator may be a macroporous structure, such as in the case of nonwoven structures made of spun polymer and glass fibers. Alternately, the separator may be a microporous structure, such as in the case of polymeric films with or without fillers.

More specifically, one known type of separator comprises a nonwoven fibrous material, the nonwoven fibrous material typically having a high porosity, an average pore size of at least 10 microns, and low resistivity. An example of such a separator is disclosed in U.S. Pat. No. 4,279,979, inventors Benson et al., which issued Jul. 21, 1981, and which is incorporated herein by reference. In particular, in the aforementioned patent, there is disclosed a nonwoven fibrous substrate for a battery separator. The aforementioned substrate, which is said to be for an alkaline battery separator, is made of a lightweight, porous, heat bonded, synthetic organic sheet material having a basis weight of less than about 35 gsm and a thickness of less than about 200 microns. The major fibrous component is synthetic pulp comprising thermoplastic polyolefin fibers having a prefused microfibrillar structure similar to wood pulp. The minor fibrous component is a high tenacity polyamide fiber having a fiber length greater than about 6 mm. The heat bonding by partial fusion of the microfibrillar polyolefin is sufficient to impart to the sheet material a wet tensile strength of at least 400 g/in width while permitting retention of air permeability of about 100 liters per minute and more. The substrate is said to be particularly well-suited for use in nickel-zinc batteries.

Another known type of separator is disclosed in U.S. Pat. No. 4,283,442, inventors Machi et al., which issued Aug. 11, 1981, and which is incorporated herein by reference. In particular, in the aforementioned patent, there is disclosed a method of producing a dimensionally stable battery separator. The method is characterized by grafting acrylic acid and/or methacrylic acid onto a polyethylene film, treating the resulting membrane with an aqueous alkaline solution, and drying the treated membrane under application of tension.

Still another known type of separator comprises a microporous sheet product that is formed by extruding a composition that includes a polyolefin and a liquid plasticizer and, thereafter, removing the plasticizer to produce a sheet with a microporous structure. Conventionally, such plasticizers are high molecular weight oils (i.e., a carbon chain of 10 to 70 carbon atoms) that are selected based on their compatibility with the polymeric material during the initial steps of sheet formation including phase-separation and that are readily extractable during process formation. In particular, mineral oil is commonly used as a plasticizer for lithium battery separators. Extraction of the plasticizer is conventionally achieved by washing the plasticizer from the cooled initially-formed sheet using a compatible, low molecular weight liquid solvent (e.g., hexane). The voids resulting from the removal of the plasticizer provide substantially uniform porosity throughout the resultant separator sheet product.

Yet another example of a separator is disclosed in U.S. Patent Application Publication No. US 2013/0029126 A1, inventor Yen, which was published Jan. 31, 2013, and which is incorporated herein by reference. In particular, in the aforementioned publication, there is disclosed a sheet product suitable for use as a battery separator, as well as a method of forming the sheet product. The method comprises forming a mixture of a polyolefin and a fluid having a high vapor pressure, shaping the mixture into a sheet material and subjecting the sheet material to stretching/fluid vaporization at high temperature to form an intermediate material having a ratio of percent fluid to percent polymer crystallinity of between 0.15 and 1, followed by a second stretching/fluid vaporization at a lower temperature while removing a portion of the remainder of the fluid from the sheet. The resultant sheet is annealed and the remainder of fluid is removed to form a sheet product having a thickness comprising a stratified structure of small and larger pore layered configuration across its thickness.

A further example of a separator is disclosed in U.S. Pat. No. 6,461,724 B1, inventors Radovanovic et al., which issued Oct. 8, 2002, and which is incorporated herein by reference. In this patent, there is disclosed a microporous material comprising a polypropylene polymer having at least 20 percent crystallinity; and a compatible, amorphous, glassy polymer, wherein said polymers are miscible in a compound when heated above the melting temperature of the polypropylene polymer and phase separate from the compound when cooled below the crystallization temperature of the polypropylene polymer. A preferred amorphous glassy polymer compatible with polypropylene is said to be cyclic olefinic copolymers including ethylene norbornene copolymers. Compounds said to be suitable for the melt-blending of the polypropylene polymer with the amorphous, glassy polymer include mineral oil and mineral spirits.

Additional documents that may be of interest include the following, all of which are incorporated herein by reference: U.S. Pat. No. 8,748,028 B2, inventors Takita et al., issued Jun. 10, 2014; U.S. Pat. No. 8,728,617 B2, inventors Benenati et al., issued May 20, 2014; U.S. Pat. No. 8,703,283 B2, inventors Goerlitz et al., issued Apr. 22, 2014; U.S. Pat. No. 8,262,973 B2, inventors Lee et al., issued Sep. 11, 2012; U.S. Pat. No. 8,092,877 B2, inventors Jester et al., issued Jan. 10, 2012; U.S. Pat. No. 8,048,520 B2, inventors Hayes et al., issued Nov. 1, 2011; U.S. Pat. No. 7,288,316 B2, inventor Jester, issued Oct. 30, 2007; U.S. Pat. No. 6,696,524 B2, inventor Hausmann, issued Feb. 24, 2004; U.S. Pat. No. 6,242,127 B1, inventor Paik et al., issued Jun. 5, 2001; U.S. Pat. No. 6,013,151, inventors Wu et al., issued Jan. 11, 2000; U.S. Pat. No. 5,939,181, inventors Kumano et al., issued Aug. 17, 1999; U.S. Pat. No. 5,336,573, inventors Zuckerbrod et al., issued Aug. 9, 1994; U.S. Pat. No. 4,699,857, inventors Giovannoni et al., issued Oct. 13, 1987; U.S. Pat. No. 4,539,256, inventor Shipman, issued Sep. 3, 1985; U.S. Pat. No. 4,285,751, inventors Feinberg et al., issued Aug. 25, 1981; U.S. Pat. No. 4,210,709, inventors Doi et al., issued Jul. 1, 1980; U.S. Pat. No. 4,024,323, inventor Versteegh, issued May 17, 1977; U.S. Pat. No. 3,920,588, inventors Traeubel et al., issued Nov. 18, 1975; U.S. Pat. No. 3,679,540, inventors Zimmerman et al., issued Jul. 25, 1972; U.S. Pat. No. 3,351,495, inventors Larsen et al., issued Nov. 7, 1967; U.S. Patent Application Publication No. US 2015/0228948 A1, inventors Maruyama et al., published Aug. 13, 2015; U.S. Patent Application Publication No. US 2014/0147726 A1, inventor Toyoda, published May 29, 2014; U.S. Patent Application Publication No. US 2013/0280584 A1, inventor Matsumura, published Oct. 24, 2013; U.S. Patent Application Publication No. US 2013/0052735 A1, inventors DeRosa et al., published Feb. 28, 2013; U.S. Patent Application Publication No. US 2006/0051530 A1, inventors Schwarz et al., published Mar. 9, 2006; U.S. Patent Application Publication No. US 2003/0124324 A1, inventors Langley et al., published Jul. 3, 2003; PCT International Publication No. WO 2013/065738 A2, published May 10, 2013; European Patent Application Publication No. EP 2 881 163 A1, published Jun. 10, 2015; European Patent No. EP 1 157 653 B1, published Jan. 26, 2011; Chinese Patent Application No. CN 103213364 A, published Jul. 24, 2013; Chinese Patent Application No. CN 101541534 A, published Sep. 23, 2009; and Baldwin, "A Review of State-of-the-Art Separator Materials for Advanced Lithium-Based Batteries for Future Aerospace Missions," NASA/TM-2009-215590 (2009).

SUMMARY OF THE INVENTION

It is an object of the present invention to provide a novel microporous sheet product.

According to one aspect of the invention, there is provided a microporous sheet product, the microporous sheet product made by a method comprising (a) forming a mixture of (i) a cyclic olefin copolymer, (ii) an electrolyte swellable thermoplastic, and (iii) a compatibilizing agent that promotes mixing of the cyclic olefin copolymer and the electrolyte swellable thermoplastic, the compatibilizing agent having a boiling point in the range of 135-300° C.; (b) casting the mixture to form a sheet material; and (c) cooling the sheet material.

In a more detailed feature of the invention, the cyclic olefin copolymer may comprise an ethylene-norbornene cyclic olefin copolymer.

In a more detailed feature of the invention, the cyclic olefin copolymer may have a glass transition temperature of about 70-180° C.

In a more detailed feature of the invention, the cyclic olefin copolymer may have a glass transition temperature above 90° C.

In a more detailed feature of the invention, the cyclic olefin copolymer may have a glass transition temperature above 110° C.

In a more detailed feature of the invention, the cyclic olefin copolymer may have a glass transition temperature above 130° C.

In a more detailed feature of the invention, the cyclic olefin copolymer may have a glass transition temperature of 180° C., a heat deflection temperature of 170° C., a melt temperature of 270-320° C., and a volumetric flow index of 1.5 ml/10 min, tested at 260° C. and 2.16 kg load.

In a more detailed feature of the invention, the cyclic olefin copolymer may have a molecular weight below 100,000 Da.

In a more detailed feature of the invention, the cyclic olefin copolymer may have a molecular weight below 60,000 Da.

In a more detailed feature of the invention, the cyclic olefin copolymer may have a molecular weight below 30,000 Da.

In a more detailed feature of the invention, the cyclic olefin copolymer may constitute about 10-70% by volume of the mixture.

In a more detailed feature of the invention, the electrolyte swellable thermoplastic may include at least one electronegative atom, such as an oxygen atom or a fluorine atom, that promotes swelling when exposed to a suitable electrolyte.

In a more detailed feature of the invention, the electrolyte swellable thermoplastic may be selected from the group consisting of polyoxyethylene, polypropylene oxide, hydroxypropyl cellulose, hydroxypropyl methyl cellulose, polyvinyl alcohol, poly (methyl methacrylate), polyacrylic nitrile, polyvinylidene fluoride, hexafluoral propylene, tetrafluoral ethylene, chloro-trifluoral ethylene, and polyvinylidene fluoride-hexafluoropropylene-tetrafluoroethylene.

In a more detailed feature of the invention, the electrolyte swellable thermoplastic may be selected from the group consisting of polyoxyethylene and polyvinylidene fluoride-hexafluoropropylene-tetrafluoroethylene.

In a more detailed feature of the invention, the electrolyte swellable thermoplastic may have a molecular weight above 30,000 Da.

In a more detailed feature of the invention, the electrolyte swellable thermoplastic may have a molecular weight above 60,000 Da.

In a more detailed feature of the invention, the electrolyte swellable thermoplastic may have a molecular weight above 100,000 Da.

In a more detailed feature of the invention, the electrolyte swellable thermoplastic may have a higher molecular weight and a higher melt viscosity than the cyclic olefin copolymer.

In a more detailed feature of the invention, the electrolyte swellable thermoplastic may constitute about 5-70% by volume of the mixture.

In a more detailed feature of the invention, the compatibilizing agent may be a low molecular weight, high vapor pressure liquid hydrocarbon.

In a more detailed feature of the invention, the compatibilizing agent may have a boiling point in the range of about 170-250° C.

In a more detailed feature of the invention, the compatibilizing agent may have a flash point characteristic within the range of about 30-170° C.

In a more detailed feature of the invention, the compatibilizing agent may be a mixture of fluids whose individual components have boiling points that span over a breadth of at least 10° C.

In a more detailed feature of the invention, the compatibilizing agent may be a mixture of fluids whose individual components have boiling points that span over a breadth of at least 15° C.

In a more detailed feature of the invention, the compatibilizing agent may be a mixture of fluids whose individual components have boiling points that span over a breadth of at least 20° C.

In a more detailed feature of the invention, the compatibilizing agent may comprise mineral spirits.

In a more detailed feature of the invention, the compatibilizing agent may constitute about 10-90% by volume of the mixture.

In a more detailed feature of the invention, the mixture may further comprise a polyolefin.

In a more detailed feature of the invention, the polyolefin may comprise at least one of polyethylene and polypropylene.

In a more detailed feature of the invention, the polyolefin may be at least one member selected from the group consisting of high density polyethylene and polypropylene polymers having a weight average molecular weight of about 20,000 Da to 8,000,000 Da.

In a more detailed feature of the invention, the polyolefin may constitute below 30% by volume of the mixture.

In a more detailed feature of the invention, the cyclic olefin polymer may constitute about 10-70% by volume of the mixture, the electrolyte swellable thermoplastic may constitute about 5-70% by volume of the mixture, and the compatibilizing agent may constitute about 10-90% by volume of the mixture.

In a more detailed feature of the invention, the mixture may further comprise at least one of an inorganic filler and a cross-linked polyacrylate polymer.

In a more detailed feature of the invention, the method may further comprise removing the compatibilizing agent from the sheet material.

In a more detailed feature of the invention, the step of removing the compatibilizing agent may comprise stretching the sheet material.

In a more detailed feature of the invention, the method may further comprise stretching the sheet material.

In a more detailed feature of the invention, the microporous sheet product may have a resistivity below 10,000 ohm-cm as tested in $LiPF_6$ electrolyte and below 300 as tested in a 30% KOH solution.

In a more detailed feature of the invention, the microporous sheet product may have a resistivity below about 3000 ohm-cm as tested in $LiPF_6$ electrolyte.

In a more detailed feature of the invention, the microporous sheet product may have an average pore size below 5 microns.

In a more detailed feature of the invention, the mixture may be an extrusion mixture, and the casting step may comprise extruding the extrusion mixture to form the sheet material.

In a more detailed feature of the invention, the mixture may be a homogeneous solution, and the casting step may comprise forming the sheet material on a substrate using a solvent cast technique.

In a more detailed feature of the invention, the substrate may be a polyolefin film, and at least a portion of the sheet material may at least partially penetrate the polyolefin film.

According to yet another aspect of the invention, there is provided a multilayer sheet product, the multilayer sheet product comprising a plurality of stacked layers, wherein at least one of the stacked layers is any of the microporous sheet products described above.

The present invention is also directed at a method of making a microporous sheet product, the method comprising the steps of (a) melt-extruding an extrusion mixture to produce a sheet material, the extrusion mixture comprising (i) a cyclic olefin copolymer, (ii) an electrolyte swellable thermoplastic, and (iii) a compatibilizing agent that promotes mixing of the cyclic olefin copolymer and the electrolyte swellable thermoplastic, the compatibilizing agent having a boiling point in the range of 135-300° C., (b) then, cooling the sheet material, whereby micropores are formed in the sheet material, and (c) then, subjecting the sheet material to a stretching/vaporizing step, whereby at least a portion of the compatibilizing agent is removed from the sheet material.

The present invention is also directed at a method of making a microporous sheet product, the method comprising the steps of (a) dissolving a cyclic olefin copolymer and an electrolyte swellable thermoplastic in a compatibilizing agent to form a homogeneous solution, the compatibilizing agent having a boiling point in the range of 135-300° C.; and (b) forming a sheet material with the homogeneous solution using a solvent cast technique.

The present invention is additionally directed at a method of separating the electrodes of a battery, the method comprising positioning, between the electrodes, any of the microporous sheet products described above.

The present invention is further directed at a method of packaging a food item, the method comprising contacting the food item with any of the microporous sheet products described above.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

The present invention is directed at a novel microporous sheet product, as well as to methods of making and using the same. According to a first embodiment of the invention, a microporous sheet product having desirable properties, such as high temperature stability, can be prepared by (a) melt-extruding an extrusion mixture to form a sheet material, the extrusion mixture comprising (i) a cyclic olefin copolymer, (ii) an electrolyte swellable thermoplastic, and (iii) a compatibilizing agent that promotes mixing between the cyclic olefin copolymer and the electrolyte swellable thermoplastic, the compatibilizing agent having a boiling point in the range of 135-300° C.; and (b) then, cooling the sheet material, whereby micropores in the sheet material are created by phase-separation, the compatibilizing agent substantially filling the micropores of the sheet material to produce a "wet" porous structure. In certain instances, for example, where the microporous sheet material is used as a food packaging material, the thus-produced microporous sheet material may be used without any further processing. In other instances, for example, where the microporous sheet material is used as a battery separator, the microporous sheet material may thereafter be processed to extract the compatibilizing agent from the sheet material, thereby producing a "dry" porous structure.

As seen from the above, the present invention is directed at a membrane that includes a cyclic olefin copolymer, an electrolyte swellable thermoplastic, and a volatile compatibilizing agent, such as mineral spirits. Such a membrane may be used as an ionically-conductive battery separator and may be used in conjunction with a porous carrier polyolefin film. The mineral spirits or other suitable compatibilizing agent is used to solvate the cyclic olefin copolymer, and the electrolyte swellable thermoplastic becomes molecularly intermixed with the cyclic olefin copolymer, creating a stable extrusion melt that may be used to form a sheet product. Mineral spirits or a like compatibilizing agent enables the processing of the cyclic olefin copolymer below its melt temperature ($T_m$), and, even more so, below its glass transition ($T_g$) temperature. The electrolyte swellable thermoplastic preferably swells in situ when exposed to electrolyte, creating capillaries for electrochemical conductivity. The article may be optionally oriented and stretched below the glass transition temperature of the cyclic olefin copolymer. The overall porous film is typically uniform, chemically and mechanically stable at high temperatures, and affords excellent conductivity in a lithium ion electrolyte. The electrolyte swellable thermoplastic preferably acts as a solid polymer electrolyte, forming a gel with electrolyte. The sheet product may be multi-layered and may have all layers processed with the same evaporative solvent, such as mineral spirits, thus allowing cyclic olefin copolymer molecules to partially migrate and to impregnate an adjacent layer, forming a unitary product that has conductivity and dimensional stability.

Without wishing to be limited to any particular theory behind the invention, it is noted that, although the cyclic olefin copolymer exhibits excellent stability at high temperatures, it is difficult to process via conventional plastic processing equipment. Due to the amorphous nature of the cyclic olefin copolymer, the cyclic olefin copolymer does not phase-separate to form a porous membrane. Instead, cyclic olefin copolymer, by itself, tends to create films of low elasticity and low porosity. A typical cyclic olefin copolymer film is unable to be stretched or oriented below the glass transition temperature of the cyclic olefin copolymer. The use of mineral spirits or a similar compatibilizing agent in the present invention is used to solvate cyclic olefin copolymer and to allow the extrusion and stretching of a cyclic olefin copolymer-containing film below its $T_g$.

In addition, by utilizing an electrolyte swellable thermoplastic with the cyclic olefin copolymer, the electrolyte swellable thermoplastic may swell and gel when used in a battery and contacted with electrolyte, thereby creating porosity in situ. This is demonstrated by the swelling of the separator in thickness after exposure to electrolyte. The resulting porous film possesses ionic conductivity in an electrochemical cell while exhibiting very low shrinkage when exposed to elevated temperatures. The electrolyte swellable thermoplastic swells in electrolyte, especially at elevated temperatures, thus resisting the shrinkage of an adjacent coated, laminated or co-extruded porous polyolefin film and improving the dimensional stability of the film in its entirety. Preferably, the separator swells in thickness by at least 1% in electrolyte after storage at 70° C., more preferably by at least 2% in electrolyte after storage at 70° C., most preferably by at least 5% in electrolyte after storage at 70° C.

The gelled electrolyte swellable thermoplastic also has the added benefit of migrating outside of the separator when a rise in cell temperature occurs. This increases overall electrolyte viscosity, immobilizes the electrolyte, and limits electrolyte oxidation on thermal runaway. Inorganic fillers may be incorporated into the membrane to further improve stability and electrode separation within a cell. In the case of temperature excursion (thermal runaway), the separator maintains its structure and prevents shorting or direct contact of the oppositely charged electrodes. The shrinkage in either direction of the separator is preferred to be below 5% at 120° C. or below 30% at 180° C.

According to a second embodiment of the invention, a microporous sheet product having desirable properties can be prepared by dissolving a cyclic olefin copolymer and an electrolyte swellable thermoplastic in a suitable solvent to form a homogeneous solution and then casting the homogeneous solution to form a singular film or a coating on a suitable substrate, such as a porous film or a battery electrode.

When the membrane of the present invention is provided as part of a multilayer structure, the cyclic olefin copolymer may impregnate an adjacent layer during processing, thereby improving the bonding of the layers. Preferably, such impregnation is by at least 1%, more preferably by at least 5%. In addition, the electrolyte swellable thermoplastic may migrate into one or more adjacent layers to form a continuous gelled electrolyte, thereby reducing the pore size of the multilayer structure. Moreover, a carrier membrane having an uncoated surface may be used to make available thermal shutdown on battery thermal runaway. Shutdown occurs when the resistivity of the separator increases by at least 100 times, rendering the battery inactive. The shutdown temperature is preferred to be below 170° C. and more preferably below 140° C.

For purposes of clarity, some of the terms used herein and in the appended claims to describe the subject invention are explained further below:

The term "sheet material" is intended to refer to a unitary article having two large surfaces with respect to its length and breadth dimensions and having a thickness between said surfaces. In general, the term is used to describe structures achieved during the initial extrusion or shaping of material into a sheet-like form and of structures produced during subsequent processing of the sheet material.

The term "sheet product" is intended to encompass a single-layer or multi-layer structure consisting of a single sheet material or comprising a plurality of stacked or laminated sheet materials.

The term "thermoplastic" is intended to refer to a polymer that becomes pliable or moldable above a specific temperature and returns to a solid state upon cooling. The molecular chains of a thermoplastic polymer typically disassociate on heating and associate through intermolecular forces on cooling and restore the bulk properties. Thermoplastics typically have distinctive melting and glass transition temperatures. The physical properties of a thermoplastic change drastically on phase change.

The terms "fluid," "liquid," or "solvent," used interchangeably, refer to liquid components used in the formation of the initial polymer/fluid mixture to form sheet material. These terms may also be used in reference to a liquid used in a cooling bath for initial cooling of a formed sheet material, fluid used in other processing steps, and for the fluid removed during a stretching/fluid vaporization step.

The term "separator" is intended to refer to a component of a battery, in particular a storage battery, by which the component maintains a separation between adjacent electrode plates or elements of opposite polarity of acid, base or organic electrolytes. The separator may be of various configurations, such as flat, ribbed, corrugated sheet which may be in the form of a membrane or envelope capable of maintaining separation of adjacent electrodes.

The term "dendrite" is intended to refer to growths that develop on and extend outward from the surface of an electrode element and are due to the re-plating of electrode material during cycling of the battery. Dendrite formations that traverse through a separator from one electrode to another electrode of opposite polarity may cause shorting of the battery cell.

The term "fluidity" is intended to refer to polymeric compositions that exhibit flow properties that are caused by the physical ability of the polymer molecules of the composition to slide over one another. This ability is enhanced by the inclusion of a fluid material, especially when contacting the polymer therewith, exhibiting at least partial solubility.

The term "crystallinity" refers to a regular or structured orientation of polymer molecules with respect to each other within a polymer mass and is distinguished from a random, irregular orientation of polymer molecules within a polymer mass to give an amorphous material. The crystallinity of a polymer mass can be determined, for example, by conventional x-ray diffraction analysis.

As noted above, according to one embodiment, the microporous sheet product of the present invention may be formed, at least in part, by melt-extruding an extrusion mixture, the extrusion mixture comprising (a) a cyclic olefin copolymer, (b) an electrolyte swellable thermoplastic polymer, and (c) a compatibilizing agent, the compatibilizing agent promoting mixing between the cyclic olefin copolymer and the electrolyte swellable thermoplastic polymer and also creating micropores in the resultant sheet material.

The cyclic olefin copolymer (COC) of the above-described extrusion mixture may comprise a single cyclic olefin copolymer or a mixture of two or more cyclic olefin copolymers, norbornene polymer or cyclic olefin polymer. Each cyclic olefin copolymer may be an amorphous copolymer based on cyclic olefins and linear olefins. The cyclic olefins may be derived from the monomer norbornene, and the linear olefins may be derived from the monomer ethylene. The cyclic olefin copolymer of the present invention preferably has a high glass transition temperature $T_g$. Depending on the grade of cyclic olefin copolymer, the $T_g$ of the cyclic olefin copolymer may be about 70-180° C., with a melt temperature of about 190-320° C. Preferably, the $T_g$ of the cyclic olefin copolymer is above 90° C., more preferably above 110° C., most preferably above 130° C. Examples of suitable cyclic olefin copolymers for purposes of the present invention include TOPAS 8007, 6013, 6015, and 6017 cyclic olefin copolymers, which are available from Topas Advanced Polymers, Inc. (Florence, Ky.). Of these cyclic olefin copolymers, TOPAS 6017 is particularly preferred, TOPAS 6017 having a $T_g$ of 180° C., a heat deflection temperature of 170° C., a melt temperature of 270-320° C., and a volumetric flow index (VFI) of 1.5 ml/10 min, tested at 260° C. and 2.16 kg load. The solvated cyclic olefin copolymer should have a higher VFI than the electrolyte swellable thermoplastic at the processing or melt temperature of the cyclic olefin copolymer.

Other polymers of cyclic olefin (without the ethylene) having a comparable $T_g$ may also be used.

As noted above, the cyclic olefin copolymer of the present invention may comprise one or more cyclic olefin copolymers. Where a plurality of cyclic olefin copolymers are used, the two or more cyclic olefin copolymers may be chemically distinct types of cyclic olefin copolymer or may be a blend of different molecular weight grades of the same type of cyclic olefin copolymer.

The cyclic olefin copolymer preferably constitutes about 10-70% by volume of the extrusion mixture.

The electrolyte swellable thermoplastic (EST) of the above-described extrusion mixture may comprise a single electrolyte swellable thermoplastic polymer or a mixture of two or more electrolyte swellable thermoplastic polymers. Each electrolyte swellable thermoplastic polymer typically includes an electronegative atom, such as an oxygen atom or a fluorine atom, or a hydroxyl group to facilitate swelling when exposed to a lithium or other suitable electrolyte. Examples of suitable electrolyte swellable thermoplastics for purposes of the present invention include polyoxyethylene (i.e., polyethylene oxide), polypropylene oxide, hydroxypropyl cellulose, hydroxypropyl methyl cellulose, polyvinyl alcohol, poly (methyl methacrylate), polyacrylic nitrile, polyvinylidene fluoride, hexafluoral propylene, tetrafluoral ethylene, chloro-trifluoral ethylene (e.g., SOLEF grades from Solvay) and a fluorocarbon terpolymer of PVDF-HFP-TFE polyvinylidene fluoride-hexafluoropropylene-tetrafluoroethylene (e.g., DYNAMAR FX5911, 3M, St. Paul, Minn.). Particularly preferred electrolyte swellable thermoplastic polymers include POLYOX polyethylene oxide from The Dow Chemical Co. (Midland, Mich.) and the aforementioned fluoropolymers, copolymers being preferred and terpolymers being more preferred, such as FX5911 from 3M, which has a melt temperature of 110° C.

Preferably, the electrolyte swellable thermoplastic has a higher melt viscosity than the solvated cyclic olefin copolymer at the processing temperature. In addition, the electrolyte swellable thermoplastic preferably has a higher molecular weight than the cyclic olefin copolymer. For example, the molecular weight for the electrolyte swellable thermoplastic is preferably above 30,000 Da, more preferably above 60,000 Da, and most preferably above 100,000 Da. By comparison, the cyclic olefin copolymer preferably has a molecular weight below 100,000 Da, more preferably below 60,000 Da, and most preferably below 30,000 Da. By having the electrolyte swellable thermoplastic have a higher molecular weight and a higher melt viscosity than the cyclic olefin copolymer, the cyclic olefin copolymer may form the continuous phase of the membrane, with the electrolyte swellable thermoplastic forming the discontinuous phase of the membrane. The higher molecular weight swellable thermoplastic tends to become entrapped within the cyclic olefin copolymer network, forming an overall swellable porous membrane. This viscosity effect is even more pronounced when the cyclic olefin copolymer and electrolyte swellable thermoplastic are solvated in the compatibilizing agent.

The electrolyte swellable thermoplastic preferably constitutes about 5-70% by volume of the extrusion mixture.

The compatibilizing agent of the aforementioned extrusion mixture is preferably an organic fluid that is capable of solubilizing and lowering the melting point temperature of the cyclic olefin polymer and that is capable of plasticizing the electrolyte swellable thermoplastic polymer, thereby allowing the formation of a uniform melt of the three materials (i.e., cyclic olefin copolymer, electrolyte swellable thermoplastic, and compatibilizing agent). In addition, the compatibilizing agent may also serve to create (i.e., by phase-separation) micropores in the sheet material.

Thus, the compatibilizing agent acts as a solvent with respect to the cyclic olefin polymer to allow the polymers and itself to form a uniform polymeric mixture having fluidity at elevated temperatures (e.g., 100-250° C.) to provide an initial sheet material. The compatibilizing agent according to the present invention is preferably a low molecular weight, high vapor pressure organic liquid selected from the group of aliphatic, cycloaliphatic, aromatic, decalin, paraffinic liquids, such as mineral spirits, and any of its individual components, lower molecular weight alkanes, $C_9$-$C_{20}$ hydrocarbons, such as nonane, decane, p-xylene, undecane, dodecane, octadecane to icosane, and the like, and mixtures thereof. A suitable compatibilizing agent should have a vapor pressure of about 1-50 mm Hg (e.g., 1-5, 5-10, 10-20, 20-40) at 70° C. and preferably also have a vapor pressure of about 0.1-5 mm Hg at 20° C. A suitable compatibilizing agent should also have a boiling temperature of about 135-300° C. (i.e., 275-572° F.), with boiling temperatures from about 170-250° C. (i.e., 338-482° F.) being preferred. Finally, the compatibilizing agent should have a flash point characteristic within the range of about 30-170° C. (i.e., 86-338° F.). A preferred compatibilizing agent is a mixture of fluids whose individual components have boiling points that span over a breadth of at least 10° C., more preferably 15° C., most preferably 20° C., and, in so doing, enhance the ability to provide controlled multiple temperatures and multiple steps solvent evaporation. Mineral spirits is a particularly preferred compatibilizing agent that possesses the ability to dissolve cyclic olefin polymer at room temperature without requiring the input of additional heat. By contrast, mineral oil was found to be a poor solvent for cyclic olefin copolymer at room temperature and did not fully solvate cyclic olefin copolymer even with heating above 200° C. Consequently, mineral oil would not be regarded as a suitable compatibilizing agent for purposes of the present invention.

As noted above, the compatibilizing agent phase-separates from the various polymers and, in so doing, creates micropores in the thus-formed sheet material. In those instances where, for example, the microporous sheet material is to be used as a food packaging material, no further processing of the microporous sheet material may be needed. On the other hand, in those instances where, for example, the microporous sheet material is to be used, for example, as a battery separator, the microporous sheet material may thereafter be treated so that the compatibilizing agent is removed from the microporous sheet material. As discussed further below, such removal of the compatibilizing agent may be effected, for example, by a conventional solvent extraction technique and/or by the stretching/vaporization technique of U.S. Patent Application Publication No. US 2013/0029126 A1. The removal of the compatibilizing agent in the aforementioned fashion creates open (available) capillaries for electrolyte conductivity in the finished sheet product.

The compatibilizing agent preferably constitutes about 10-90% by volume of the mixture.

The above-described extrusion mixture may further comprise small amounts of fillers, colorants, anti-oxidants, stabilizers, and the like. For example, the mixture may comprise one or more inorganic fillers, which may improve the porosity and rate of swelling of the sheet product. Where the sheet product is used as a battery separator, such swelling creates beneficial cell stack pressure. Suitable inorganic fillers may include, but are not limited to, carbonates and oxides of silicon (e.g., silicates), aluminum, lithium, magnesium, calcium, titanium, zinc, zirconium and barium. Such an inorganic filler may be in the form of fine particles, preferably about 0.01-10 microns in diameter. Such particles may have a surface area of at least 5 $m^2$/g, preferably from about 5-200 $m^2$/g, may have a pore volume (BET) of from about 0.01-1 ml/g, and preferably are capable of absorbing liquids and plasticizers. The particles may be prepared by any method that results in fine particles, such as, but not limited to, milling, condensation, precipitation, fume condensation, or any other appropriate method. These compounds, when added to the extrusion mixture, increase porosity, especially after stretching of the polymer sheet material. Preferably, the filler material is essentially insoluble in the intended medium, e.g., basic solution for alkaline application, and has an elevated melting temperature of over 500° C. Other examples of suitable fillers are disclosed in U.S. Pat. No. 8,388,878, which is incorporated herein by reference.

Where a filler is used as part of the extrusion mixture, the filler preferably constitutes about 0-20% by volume of the mixture.

The above-described extrusion mixture may further comprise a thermoplastic polyolefin polymer. Such a thermoplastic polyolefin polymer may be used, for example, as an extrusion aid in forming the sheet material.

The thermoplastic polyolefin polymer may include one or more thermoplastic polyolefin polymers and, in particular, may include one or more thermoplastic polyolefin homopolymers or copolymers. Preferred thermoplastic polyolefin polymers include polyethylenes and polypropylenes, either in the form of homopolymers or copolymers, such as polyethylene of low or linear low density, high density, ultrahigh molecular weight, ethylene-butene copolymers, ethylene-hexene copolymers and the like and mixtures thereof. Preferred classes of thermoplastic polyolefin polymers are high density polyethylene and polypropylene having a weight average molecular weight of from about 20,000 Da to about 8,000,000 Da, more preferably about 200,000 Da to about 1,000,000 Da.

Melt flow index or MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method for determining MFI is described in ASTM D1238 and ISO 1133. Melt flow rate is an indirect measure of the molecular weight of a polymer. Preferred thermoplastic polyolefin polymers for use as the thermoplastic polyolefin polymer of the present invention have a Melt Flow Index (MFI) below about 10, preferably in the range of 0.001-2.

As noted above, the thermoplastic polyolefin polymer may comprise multiple polymers. For example, a polyethylene may be blended with a polypropylene in varying percentages. Alternatively, a blend of different molecular weight grades of the same polymer (e.g., a polyethylene) may be used.

Preferably, the above-described thermoplastic polyolefin polymer is present in as low a percentage as possible so as not to interrupt the cyclic olefin copolymer network stability. Preferably, the thermoplastic polyolefin polymer constitutes below 30% by volume of the extrusion mixture.

The above-described extrusion mixture may further comprise a cross-linked cation polyacrylate, such as a lithium polyacrylate, to improve electrolyte conductivity.

As noted above, an extrusion mixture of the type described above may be melt-extruded to produce a microporous sheet material, and, depending on the use to which the microporous sheet material is intended to be put, the microporous sheet material may then undergo additional processing. Details of a suitable melt-extrusion process and of a suitable method for processing the extruded sheet material to produce a microporous sheet product suitable for use as a battery separator are provided below.

First, the extrusion mixture may be prepared, for example, by blending the polymers and the compatibilizing agent at an elevated temperature. During the preparation of this mixture, the polymer mass loses a substantial degree of its crystallinity. The polymers and compatibilizing agent are typically mixed together until they form a substantially uniform composition, i.e., a single phase. Such mixing may be performed prior to or during the extrusion process, such as by feeding the polymers and the compatibilizing agent into a single- or twin-screw feed chamber of an extruder. An example of a suitable extruder is disclosed in PCT International Publication No. WO 2009/051278 A2, which was published on Apr. 23, 2009, and which is incorporated herein by reference. Though not particularly critical, the uniform melt-blending is preferably conducted in a double-screw extruder. The compatibilizing agent may be added before melt-blending starts or it may be supplied to the extruder in an intermediate section of the blending. The melted material may then be pumped through a heated metal slotted die, which may be used to form the extrudate into a shaped film of sheet material.

The thus-formed sheet material may then be cooled. This may be accomplished, for example, by casting the sheet material onto a chilled roll or by immersing the sheet material in a cooling bath for a sufficient time to solidify the sheet material. The cooling roll or bath is preferably maintained at a temperature below 100° C. so that the sheet material is cooled below the melt temperature of the thermoplastic polymer.

Upon cooling, the mixture of cyclic olefin copolymer (COC), electrolyte swellable thermoplastic (EST) and compatibilizing agent will phase-separate, forming a COC-rich phase, an EST-rich phase, and compatibilizing agent dispersed in the interstices. The COC and compatibilizing agent form the continuous phase of the membrane, with the crystallizable EST polymer being encapsulated by the amorphous COC polymer.

In certain instances, for example, where the sheet material is to be used as a food packaging material, it may be acceptable for the compatibilizing agent to be retained in situ. In other instances, for example, where the sheet material is to be used as a battery separator, the cooled sheet material may be subjected to some form of processing to remove at least some of the compatibilizing agent from the sheet material. Such processing may involve a stretching/fluid vaporization technique that may comprise, in a first step, stretching the sheet in at least one direction. This first direction of stretching may be conducted in the machine direction from which the sheet material exits the extrusion die head and the cooling bath. The stretching can be readily accomplished, for example, by passing the sheet material through nip rollers of a set rotation surface speed and then through a second set of higher speed nip rollers prior to a take-up roller. Alternately, other conventional stretching means can be used, such as a tenter method, an inflation method or a combination thereof. The stretching in the first direction may involve stretching the sheet material while maintaining the sheet material at an elevated temperature. The stretching in the first direction may be accomplished in a one-step operation or in a series of stretching operations to achieve the desired degree of elongation of the sheet material.

Subsequent to or simultaneous with stretching in a first direction, the sheet material may be stretched in a second direction, which second direction may be transverse to the first stretching direction. The second stretch may be transverse to the machine direction where the first stretch was in the machine direction or vice versa. The second stretch is preferably done while maintaining the sheet at an elevated temperature of the type employed for the first stretch. The combined stretches may have an overall ratio of about 2-100 fold of the original biaxial area. Depending on the formulation, machinery set-up, the stretching may be performed in sequential monoaxial steps or simultaneous biaxial (machine and transverse direction) stretches although monoaxial stretching is preferred. When performed sequentially, the first and second stretches may be performed in either sequence. In the case of biaxial stretching, any of simultaneous biaxial stretching, sequential stretching or multi-stage stretching (for instance, a combination of the simultaneous biaxial stretching and the sequential monoaxial stretching) may be used. One or more of the film stretch steps can be performed as described in U.S. Patent Application Publication No. US 2013/0029126 A1, which is incorporated herein by reference. The above-described stretching may serve not only to further open porosity in the sheet but also to reduce the thickness of the sheet and to align molecular structures to maximize mechanical strength.

Simultaneous to the stretching, a portion or all of the compatibilizing agent may be removed from the sheet material by vaporization. The ease with which a given compatibilizing agent may be vaporized will depend on the volatility of the compatibilizing agent. Certain compatibilizing agents, such as mineral spirits, are highly volatile and can easily be vaporized by stretching at an elevated temperature. The stretching shall incorporate residual amounts of compatibilizing agent like mineral spirits to allow stretching below the glass transition temperature of the cyclic olefin copolymer. The residual amount of mineral spirits or other compatibilizing agent is preferred to be above 5%, more preferably above 10%. Controlled amounts of the compatibilizing agent used to form the initial composition and the shaped material may be concurrently vaporized and removed from the sheet material during each of the first and second stretching steps.

With the stretched sheet material under tension in at least one or both stretched directions, the sheet material may be subjected to annealing, or elevated temperature sheet stabilization. The annealing temperature may be between $(T_m-50)$ to $(T_m-5)°$ C. with respect to the lowest $T_m$ of the thermoplastic forming the sheet material. A co-extruded film may be processed in a similar manner.

Instead of using stretching/fluid vaporization to remove the compatibilizing agent, the compatibilizing agent may be extracted with a suitable solvent, such as a hydrocarbon like hexane and one or more chlorinated solvents well-known in the industry.

As an alternative to the above-described melt-extrusion process, according to another embodiment of the invention, the cyclic olefin copolymer may be dissolved in the compatibilizing agent, such as mineral spirits, by stirring, with the electrolyte swellable thermoplastic thereafter being incorporated into the mixture by mixing. A solvent dissolution membrane cast technique may then be used to coat the resulting mixture onto a pre-formed separator substrate, such as a polyolefin separator substrate, with the cyclic olefin copolymer partially impregnating the polyolefin separator substrate and binding to the polyolefin substrate so as to produce a swellable and dimensionally stable multilayer separator. Such a structure does not need to be stretched.

The thickness of a "dry" microporous sheet product (i.e., a microporous sheet product where the compatibilizing agent has been removed) according to the present invention, prior to being imbibed with any liquid, may be about 0.1-20 mil (about 0.0025-0.50 mm) although the thickness may vary based on the particular application for which the sheet product is intended. For example, when used as a separator in a lithium battery, the thickness of the subject sheet product is preferably about 0.4-2 mil (about 0.01-0.05 mm).

The pores (i.e., interstices) of such a "dry" microporous sheet product may have a size in the range of about 0.001 to 100 microns. For microporous applications, the preferred range for the pores is about 0.001 to 5 microns, more preferably about 0.01 to 1 micron. For filtration applications, the preferred range for the pores is about 5 to 100 microns.

The properties of sheet products useful as battery separators include not only permeability, mechanical strength, and dimensional stability, but also properties related to electrolytic solution wicking, absorption, and battery cyclability. The present invention provides a thin, lightweight sheet product that has high electrolyte retention capability, thereby providing the battery with the ability of maintaining electrolyte over the electrode surfaces and achieving high electrolytic conductivity while, when appropriate, providing strong inhibition to formation and growth of dendrites between electrode elements of opposite polarity and mechanical strength. At the same time, the sheet product of the present invention has high temperature stability and gels with exposure to electrolyte, thereby providing good ionic conductivity in a battery. The measure of resistivity (i.e. the inverse of conductivity) is preferred to be below 10,000 ohm-cm, more preferably below about 3000 ohm-cm, as tested in $LiPF_6$ organic electrolyte, or below about 300 ohm-cm, as tested in 30% KOH electrolyte. The resistivity is targeted below 10,000 ohm-cm in organic lithium electrolyte.

The microporous sheet product of the present invention may consist of a single layer of any of the types described above or may comprise a plurality of stacked or laminated layers, one or more of which may be of any of the types described above. A laminate structure may be readily formed using conventional multi-sheet extrusion head devices (e.g. co-extrusion) or by laminating together, using heat, adhesives, or other means, two or more previously formed layers. Alternatively, a multilayer structure may also be produced by extruding, coating or laminating a mixture of the type described above onto a suitable substrate. Examples of multilayer structures are described in European Patent Application Publication No. EP 1 911 352 A1, published Apr. 16, 2008, which is incorporated herein by reference. One or more of the layers of a multilayer structure may be a protective layer, which may be non-porous to limit the permeability of moisture, oxygen, pathogens or other detrimental microorganisms and to improve film durability and final product shelf-life. The multilayer structure may comprise a middle layer sandwiched between a pair of outer layers, where the composition of the outer layers may be the same as or different in some fashion from that of the inner layer. In any event, the materials used in the various layers should be sufficiently compatible and miscible to permit adhesion during extrusion and juxtaposition of the layers. A multilayered configuration does not preclude the coating and lamination of layers with the subject article.

Although a separator according to the present invention may be a standalone film, the present separator is preferably a multilayered structure comprising at least two layers, namely, a layer A and a layer B, at least one of which is microporous. Layer A may be, for example, a polyolefin layer, and layer B may comprise a mixture of cyclic olefin copolymer, electrolyte swellable thermoplastic, and a suitable compatibilizing agent like mineral spirits. Additives, such as an inorganic filler, a superabsorbent polymer, such as a polyacrylate polymer, or a high molecular weight thermoplastic, may be incorporated into one or more of layers A and B. The aforementioned polyacrylate polymer may be in a salt form, such as lithium polyacrylate, sodium polyacrylate, and/or potassium polyacrylate, with various degrees of cross-link or without cross-linking. More preferably, the layers A and B may be in an ABA arrangement, with a layer B sandwiched between two microporous layers A; alternatively, the layers A and B may be in a BAB arrangement. The layer A may endow the product with process stability and physical strength whereas the layer B may endow the product with swelling ability, conductivity, and dimensional stability. Additional functional layers may be included, such layers including, but not limited to, adhesive layers, swellable diffusion layers, and ceramic layers. In a multilayer structure, there is preferably at least one layer with a stable cyclic olefin copolymer having a glass transition temperature above 170° C. and at least a second layer with shutdown and melting temperature below 150° C.

Figure 1:
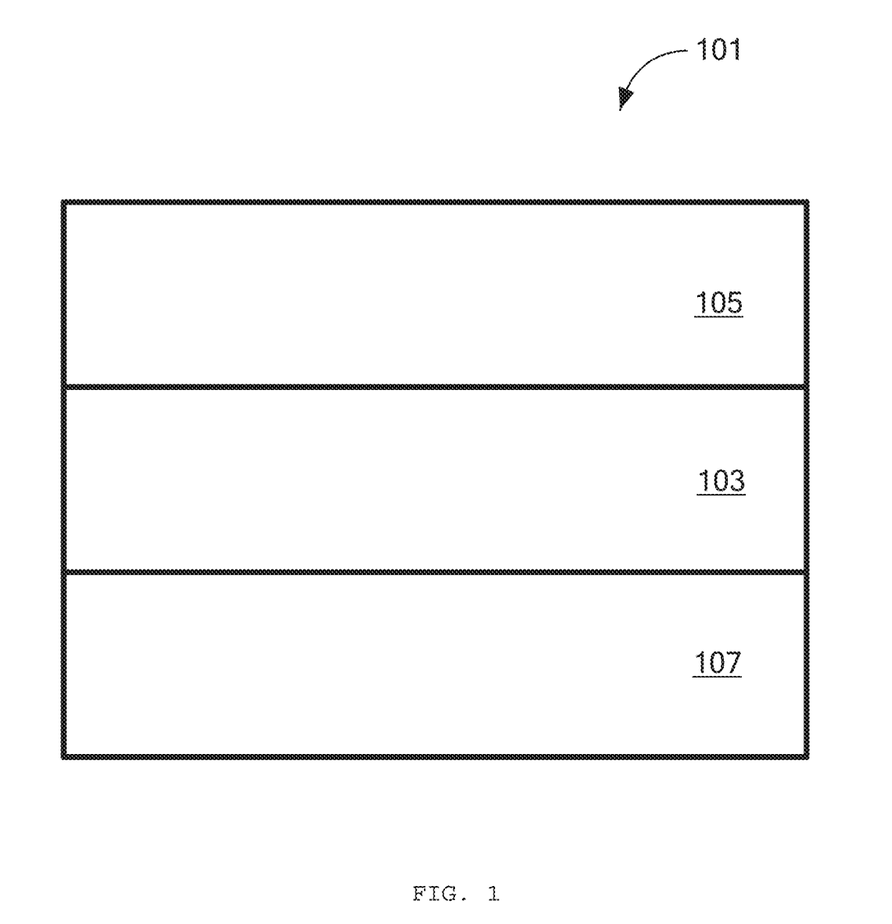
FIG. 1 is a schematic side view of a multi-layer microporous sheet product constructed according to the present invention.
Figure 2:
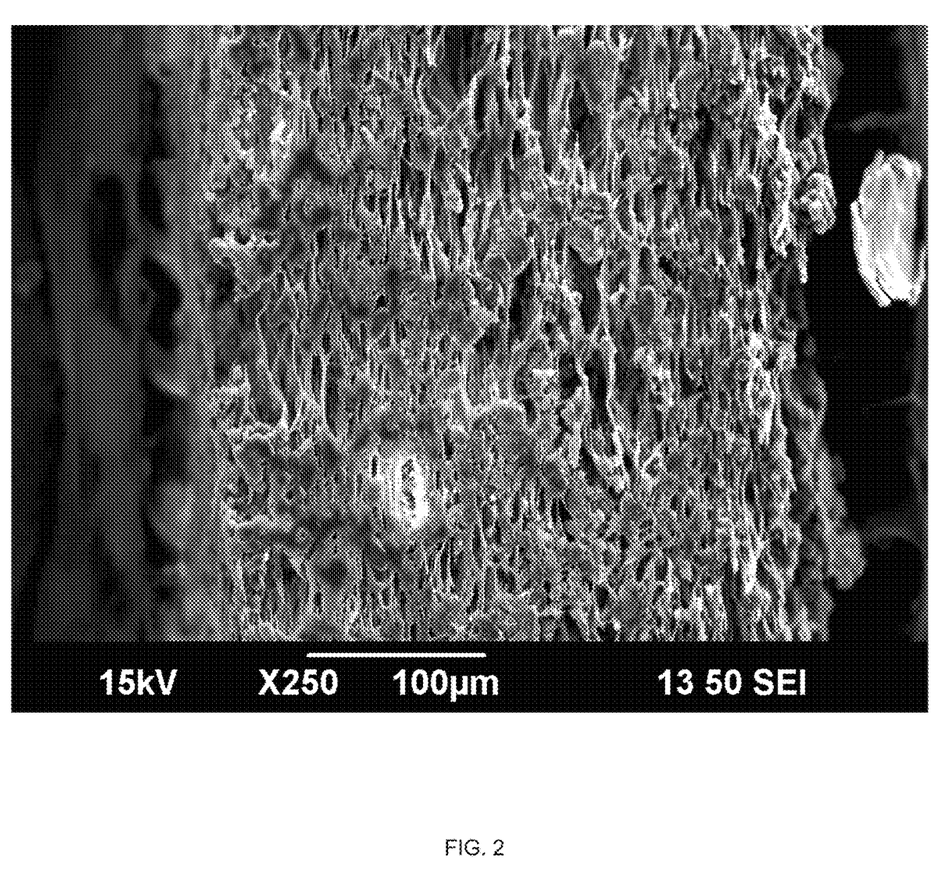
FIG. 2 is a scanning electron microscope (SEM) image of a cross-section of the microporous sheet product discussed in Example 2 as Sample 2AMT.

Referring now to FIG. 1, there is shown a schematic side view of a multilayer microporous sheet product constructed according to the present invention, the multilayer microporous sheet product being represented generally by reference numeral 101.

Multilayer microporous sheet product 101 comprises an inner layer 103 and a pair of outer layers 105 and 107, with inner layer 103 being sandwiched between outer layers 105 and 107. Inner layer 103 may be identical in composition to any of the embodiments of the microporous sheet product described above and preferably runs substantially in the same direction as the major surfaces of outer layers 105 and 107. Outer layers 105 and 107 may be identical to one another and may differ from inner layer 103 only in that outer layers 105 and 107 do not include a cyclic olefin copolymer. One or more of layers 103, 105, and 107 may be microporous and may have a pore size of from about 0.001 to 5 microns.

Layers 103, 105 and 107 may be laminated together, for example, by co-extrusion. The entire laminate may be handled and stretched as a single unit.

As can be appreciated, although multilayer microporous sheet product 101 is of the BAB variety (layer A including the cyclic olefin copolymer and layer B not including the cyclic olefin copolymer), multilayer microporous sheet product 101 may be of the ABA variety, the AB variety, the ABC variety (with layer C differing in composition from both layers A and B), the ABCD variety (with layer D differing in composition from layers A, B and C), or other permutations.

In addition to use as a battery separator, the above-described microporous membrane may be put to other uses. For some such uses, the membrane may be used without any further modification thereto whereas, for other uses, the membrane is preferably modified in some manner. One way in which the membrane may be modified is by being imbibed with a material that endows the membrane with a specific function. The imbibing material may be a liquid or a dispersion of solid. Certain applications may require two or more reactive components as imbibing materials to permit the reaction of the reactive components within the microporous sheet structure. Examples of imbibing materials include medicaments, fragrances, flavorings, colorants, antistatic agents, surfactants, antimicrobials, pesticides and solid particulate material, such as activated carbon and pigments.

The microporous sheet product of the present invention may be laminated or coextruded to any of a variety of other structures, such as nonwoven, porous, and non-porous sheet materials, to provide a composite structure. Nonwoven materials may include, but are not limited to, glass, cellulose, polyolefins, polyamide, polyester and other polymers. Lamination may be accomplished by conventional techniques, such as extrusion coating, solvent casting, impregnation, adhesive bonding, spot-welding, co-extrusion or by other techniques which do not destroy or otherwise interfere with porosity or which do not create undesirable porosity or perforations.

The microporous sheet product of the present invention may be employed in any of a wide variety of situations where microporous structures may be utilized. For example, the microporous sheet product may be used in the ultrafiltration of colloidal matter, for example, as a diffusion barrier. Alternatively, the membrane may be used as a separator in an electrochemical cell, as capacitor paper, as a geo-membrane, as a non-woven protective scrim, as a disposable garment or diaper, or as a disposable glove.

Another application of the microporous membrane may be in the field of food packaging, such as in uncooked meat packaging, cooked meat and sausage casing, and cheese packaging, to provide flavor transfer and to promote adhesion. Other applications may be fresh meat packaging, such as chicken shrink bags and ground beef and pork display tray liners, to absorb excess processing fluids. Often packaged foods tend to expel moisture or blood from their solid structure over time. Since the membranes described herein may contain superabsorbers or other mechanisms for retaining moisture, the occurrence of pooled liquids within the food packaging may be minimized. Other applications may include packaging for fresh produce and bread, where equilibria of moisture, oxygen, and carbon dioxide levels should be attained to keep these foods fresh for a longer shelve life.

The following examples are given for illustrative purposes only and are not meant to be a limitation on the invention described herein or on the claims appended hereto. All parts and percentages given in the description, examples and claims appended hereto are by volume unless otherwise stipulated. Further, all ranges of numbers provided herein above shall be deemed to specifically disclose all subset ranges of numbers within each given range.

Where the subject membrane is used as an electrochemical cell separator, the guiding principle for determination of optimal composition is highest conductivity in alkaline electrolyte while demonstrating desirable physical and mechanical characteristics. All samples below were processed similarly, with the material mixture processed in the above-described manner via a co-rotating twin screw extruder. The extruder was set at a temperature of 100° C. at the feed zone, 200° C. at the melt zone, the extruder was vented prior to the pumping section, the extruder pumping section and die were set at 180° C. The melt extrudate was cast onto a cast roller set at 40° C., with the total extrusion rate of 4 kg/hr, the cast roller having a takeoff speed of 4 ft/min.

Materials:
Materials used in the formation of the sheet product include:
Cylic olefin copolymer (COC)—Topas 8007, 6013 or 6017 from Topas Advanced Polymers, Inc.
PEG Polyethylene oxide (Polyox) polymer WSR 308—Dow Chemical
Fluoropolymer FX5911—3M
High-Density Polyethylene (HDPE) Alathon L5906—Lyondell Basell (MFI of 0.06)
Linear Low-Density Polyethylene (LLDPE) GA601—manufactured by Lyondell Basell
Polypropylene (PP) F006EC2 from Braskem
Mineral Spirits solvent 142 distributed by Sunnyside Corp.
Silica—Sipemat 50 manufactured by Evonic
Ethylene vinyl acetate—Petrothene NA362-005, manufactured by Lyondell Basell
Equipment:
Volumetric Feeder, Model # K2MVS60, by K-Tron Corp.
Fluid pump—Neptune, model 515AN3
Twin Screw Extruder (ZSK-30) made by Krupp Werner & Pfleiderer Corporation (Ramsey, N.J.)

Cast Film Take-up made by Killion Extruders, a Davis Standard Company (Pawcatuck, Conn.)
Bi-orientation tenter frame—Marshall and Williams (Woonsocket, R.I.)
Heat gun, model 69343—Chicago Electric The following procedure was used to form each of the sheet products described below in Tables 1, 2, 3 and 4 (The comparative sheet products are summarized below in Table 5): Specified parts of polymer were fed into a twin screw melt-extruder via a volumetric feeder. The polymer was allowed to melt within the extruder, and, then, specified parts of fluid were introduced into the extruder via a metered pump. The polymer and fluid were melt-blended into a uniform fluid mixture. The total extrusion rate was set at 4 kg/hr. The mixture was formed into a sheet via a slit die. The sheet was cast onto a steel roller maintained at 30° C. The sheet material was transformed from a liquid phase to a solid phase sheet material on cooling.

The sheet was then removed from the cast take-off roller at 3 feet per minute to provide a sheet thickness suitable for being stretched. The sheet was either tested un-stretched or transversely stretched using a set of vice grips of a tensile tester. Mineral spirits was either extracted with acetone when the sample was un-stretched or heat evaporated during stretching of the samples. Resistivity was tested in lithium electrolyte unless otherwise specified.

Example 1

Referring to Table 1 below, there are shown, by composition and performance, a number of monolayer and multilayer separator samples comprising an electrolyte swellable thermoplastic in the form of polyethylene oxide polymer, fluoropolymer FX5911, or a combination thereof. Samples 1A and 1B in Table 1 refer to monolayer membranes that were used to demonstrate electrolyte swellable thermoplastic conductivity. As can be seen, Samples 1A and 1B initially at room temperature had very high resistivity; however, after exposure to lithium electrolyte at elevated temperature (70° C., one hour), the electrolyte swellable thermoplastic swelled to create electrolyte conductivity capillaries, thereby enabling electrochemical activity, causing the membrane to gain thickness and weight, and reducing the membrane resistivity. In short, Samples 1A and 1B went from non-porous separators to porous separators as a result of solvation of the electrolyte swellable thermoplastic.

TABLE 1

| | Sample | | | | | | | |
|---|---|---|---|---|---|---|---|---|
| | 1A | 1B | 1C | | 1D | | 1E | |
| Layers in ABA structure | Monolayer | Monolayer | A | B | A | B | A | B |
| COC | 42% | 32% | 0% | 11% | 0% | 19% | 0% | 31% |
| HDPE 2908 or PP | 0% | 0% | 5% | 0% | 5% | 0% | 0% | 0% |
| HDPE L5906 | 0% | 0% | 40% | 0% | 40% | 0% | 45% | 0% |
| LLDPE, GA601 | 0% | 0% | 0% | 32% | 0% | 23% | 0% | 0% |
| FX5911 | 0% | 0% | 0% | 17% | 0% | 10% | 0% | 20% |
| Silica | 0% | 6% | 1% | 3% | 1% | 3% | 1% | 3% |
| Polyox | 42% | 32% | 0% | 0% | 0% | 8% | 0% | 11% |
| Mineral Spirits | 16% | 30% | 54% | 38% | 54% | 37% | 54% | 35% |
| Total | 100% | 100% | 100% | 100% | 100% | 100% | 100% | 100% |
| Stretch treatment: MDO, % | none | none | 0% | | 0% | | 0% | |
| Stretch treatment: TDO, % | none | none | 300% | | 0% | | 0% | |
| Ave. thickness gain, 70° C., % | 81% | 35% | NA | | NA | | NA | |
| Ave. wt gain, 6 d RT storage, % | 23% | 16% | 9% | | 29% | | 15% | |
| Ave. wt gain after 1 h 70° C. storage, % | 42% | 43% | 14% | | 40% | | 26% | |
| Area shrinkage at 140° C. storage, % | 0% | 0% | NA | | NA | | NA | |
| Time to wet-out (IPA), sec. | No wet-out | No wet-out | >60 | | >60 | | >60 | |

TABLE 1-continued

| | Sample | | | | |
|---|---|---|---|---|---|
| | 1A | 1B | 1C | 1D | 1E |
| Li resistivity 16 h RT soak, ρ, Ω-cm | 66990 | 48780 | 2405 | 4756 | 4199 |
| Li resistivity after 1 h 70° C. soak, ρ, Ω-cm | 1964 | 975 | 3118 | 5053 | 3123 |

*NA = not available

Thickness was measured using a Mitutoyo 1D-C112EXB Thickness Gauge. Thickness gain percent of the sample was calculated by measuring the thickness before and after soaking in an electrolyte liquid. Similarly, the weight gain percent of the sample was calculated by measuring the weight of a sample before and after soaking (for a specific time) in an electrolyte liquid.

The resistivity of a membrane was measured by placing the membrane between a pair of electrodes immersed in an electrolyte. The electrodes were connected to an HP 4338B Milliohm Meter. When the resistance was measured by the HP meter, with and without the membrane, this difference was the resistance, recorded in ohm-cm-sq. By dividing the resistance by the thickness of the separator, this normalized the reading, or recorded in ohm-cm as the resistivity of the separator.

Example 2

Referring to Table 2 below, there are shown, by composition and performance, a number of samples in which differences in weight and thickness gain, as well as in resistivity, were investigated as a function of strength treatment. PIB refers to polyisobutylene.

TABLE 2

| | Sample ID | | | | | | | | | |
|---|---|---|---|---|---|---|---|---|---|---|
| | 2A | | 2A M | | 2A T | | 2A MT | | 2B | |
| | A and B in ABA structure | | | | | | | | | |
| | A | B | A | B | A | B | A | B | A | B |
| COC | | 20% | | 20% | | 20% | | 20% | | 16% |
| FX5911 | | 11% | | 11% | | 11% | | 11% | | 8% |
| PB | | 5% | | 5% | | 5% | | 5% | | 7% |
| LLDPE, GA601 | | | | | | | | | | 19% |
| PP F006EC2 | 68% | 19% | 68% | 19% | 68% | 19% | 68% | 19% | 68% | |
| Silica | | 6% | | 6% | | 6% | | 6% | | 7% |
| Mineral spirits | 32% | 39% | 32% | 39% | 32% | 39% | 32% | 39% | 32% | 44% |
| Total | 100% | 100% | 100% | 100% | 100% | 100% | 100% | 100% | 100% | 100% |
| Stretch treatment, MDO | 0% | | 150% | | 0% | | 150% | | 0% | |
| Stretch treatment, TDO | 0% | | 0% | | 300% | | 300% | | 0% | |
| Initial weight (ave), g | 0.452 | | 0.31 | | 0.08 | | 0.09 | | 0.45 | |
| Initial thickness (ave), μm | 518 | | 283 | | 282 | | 269 | | 537 | |
| Average wt gain, 24 h RT, % | 4% | | 27% | | 216% | | 220% | | 7% | |
| Average thickness gain, 24 h RT, % | −5% | | 52% | | −3% | | −1% | | −2% | |
| Average wt gain after 70 C., % | 2% | | 33% | | 304% | | 284% | | 5% | |
| Average thickness gain after 70 C., % | 5% | | 53% | | 8% | | 5% | | −2% | |
| Elongation, % | NA | | NA | | 200% | | 140% | | NA | |
| Tensile strength, kg/cm² | NA | | NA | | 32.6 | | 15.1 | | NA | |
| Time to wetout stretched sample (IPA), s | >60 | | 10 | | 2 | | 2 | | >60 | |
| ρ, resistivity atfter RT soak, Ω cm | 4848 | | 1027 | | 776 | | 912 | | 1461 | |
| ρ, resistivity atfter 70 C. soak, Ω cm | 11834 | | 1467 | | 823 | | 882 | | 10082 | |

| | Sample ID | | | | | | | |
|---|---|---|---|---|---|---|---|---|
| | 2B M | | 2B T | | 2B MT | | 2B MT2 | |
| | A and B in ABA structure | | | | | | | |
| | A | B | A | B | A | B | A | B |
| COC | | 16% | | 16% | | 16% | | 16% |
| FX5911 | | 8% | | 8% | | 8% | | 8% |
| PB | | 7% | | 7% | | 7% | | 7% |
| LLDPE, GA601 | | 19% | | 19% | | 19% | | 19% |
| PP F006EC2 | 68% | | 68% | | 68% | | 68% | |
| Silica | | 7% | | 7% | | 7% | | 7% |

TABLE 2-continued

| | | | | | | | | |
|---|---|---|---|---|---|---|---|---|
| Mineral spirits | 32% | 44% | 32% | 44% | 32% | 44% | 32% | 44% |
| Total | 100% | 100% | 100% | 100% | 100% | 100% | 100% | 100% |
| Stretch treatment, MDO | 150% | | 0% | | 150% | | 150% | |
| Stretch treatment, TDO | 0% | | 300% | | 300% | | 150% | |
| Initial weight (ave), g | 0.33 | | 0.07 | | 0.08 | | 0.34 | |
| Initial thickness (ave), μm | 420 | | 240 | | 230 | | 474 | |
| Average wt gain, 24 h RT, % | 30% | | 219% | | 193% | | 32% | |
| Average thickness gain, 24 h RT, % | 2% | | 0% | | 12% | | 2% | |
| Average wt gain after 70 C., % | 31% | | 259% | | 230% | | 35% | |
| Average thickness gain after 70 C., % | 1% | | 7% | | 8% | | 2% | |
| Elongation, % | NA | | 300% | | 300% | | 150% | |
| Tensile strength, kg/cm$^2$ | NA | | 31.3 | | 30.1 | | 25.3 | |
| Time to wetout stretched sample (IPA), s | >60 | | 2 | | 10 | | >60 | |
| ρ, resistivity atfter RT soak, Ω cm | 974 | | 789 | | 1253 | | 767 | |
| ρ, resistivity atfter 70 C. soak, Ω cm | 3542 | | 1499 | | 3831 | | 1843 | |

Example 3

Referring to Table 3 below, there are shown the effects of annealing various samples corresponding to Sample 2AMT above with a heat gun at 430° F. for various periods of time. As can be seen, the thermal stability of a 3-layer sample showed shrinkage can be as low as 5% at 140° C. storage.

TABLE 3

| Anneal condition | 3A | 3B | 3C | 3D |
|---|---|---|---|---|
| Run ID, Anneal temp., degrees F. | 430 | 430 | 430 | 430 |
| Run ID, Anneal time, s | 15 | 30 | 60 | 120 |
| Solvent wetout, s | ~1 | ~1 | ~1 | ~1 |
| Shrinkage, initial dimensions, mm | 50 × 50 | 50 × 50 | 50 × 50 | 50 × 50 |
| Shrink %, MD, Ave of 3, 100 C., % | 1% | −1% | −1% | 0% |
| Shrink %, TD, Ave of 3, 100 C., % | 2% | 0% | 0% | 0% |
| Shrink %, MD, Ave of 3, 120 C., % | 1% | −1% | 0% | 0% |
| Shrink %, TD, Ave of 3, 120 C., % | 3% | 1% | 1% | 1% |
| Shrink %, MD, Ave of 3, 140 C., % | 3% | 2% | 0% | 1% |
| Shrink %, TD, Ave of 3, 140 C., % | 11% | 8% | 3% | 2% |
| Shrink %, MD, Ave of 3, 160 C., % | 4% | 3% | 3% | 3% |
| Shrink %, TD, Ave of 3, 160 C., % | 19% | 17% | 11% | 7% |
| Shrink %, MD, Ave of 3, 180 C., % | 7% | 5% | 4% | 4% |
| Shrink %, TD, Ave of 3, 180 C., % | 29% | 23% | 16% | 15% |
| Shrink %, MD, Ave of 3, 200 C., % | 8% | 5% | 5% | 5% |
| Shrink %, TD, Ave of 3, 200 C., % | 30% | 24% | 19% | 17% |
| Observations (aftrer annealing step) | | | | 2 samples developed holes |
| ρ RT, Ωcm | 1074 | 1231 | 1687 | 2617 |
| ρ 70 C., Ωcm | 1298 | 1347 | 1857 | 2509 |
| ρ 105 C., Ωcm | 1297 | 1183 | 1431 | 2032 |

Example 4

Referring to Table 4 below, there are shown the effects of annealing various samples corresponding to Sample 2AMT above with a heat gun at 550° F. or 570° F. for various periods of time. As can be seen, 3% shrinkage was found to be achieved at 140° C. storage whereas over-annealing was found to increase separator resistivity, simulating thermal shutdown capability.

TABLE 4

| Anneal condition | 4A | 4B | 4C | 4D | 4E | 4F |
|---|---|---|---|---|---|---|
| Run ID, Anneal temp., degrees F. | 550 | 550 | 550 | 550 | 570 | 570 |
| Run ID, Anneal time, s | 15 | 30 | 60 | 120 | 15 | 30 |
| Solvent wetout, s | ~1 | ~1 | ~1 | >60 | ~1 | >60 |
| Shrinkage, initial dimensions, mm | 50 × 50 | 50 × 50 | 50 × 50 | 50 × 50 | 50 × 50 | 50 × 50 |
| Shrink %, MD, Ave of 3, 100 C., % | 1% | 0% | 0% | 0% | 0% | 0% |
| Shrink %, TD, Ave of 3, 100 C., % | 1% | 0% | 0% | 1% | 0% | 0% |
| Shrink %, MD, Ave of 3, 120 C., % | 1% | 1% | 1% | 0% | 1% | 0% |
| Shrink %, TD, Ave of 3, 120 C., % | 1% | 2% | 0% | 1% | 1% | 1% |

TABLE 4-continued

| Anneal condition | 4A | 4B | 4C | 4D | 4E | 4F |
|---|---|---|---|---|---|---|
| Shrink %, MD, Ave of 3, 140 C., % | 1% | 2% | 2% | 0% | 1% | 1% |
| Shrink %, TD, Ave of 3, 140 C., % | 4% | 3% | 1% | 1% | 3% | 1% |
| Shrink %, MD, Ave of 3, 160 C., % | 3% | 2% | 2% | 2% | 2% | 2% |
| Shrink %, TD, Ave of 3, 160 C., % | 9% | 5% | 3% | 2% | 8% | 3% |
| Shrink %, MD, Ave of 3, 180 C., % | 6% | 5% | 5% | 4% | 4% | 3% |
| Shrink %, TD, Ave of 3, 180 C., % | 21% | 16% | 12% | 8% | 17% | 9% |
| Shrink %, MD, Ave of 3, 200 C., % | 8% | 9% | 6% | 5% | 7% | 5% |
| Shrink %, TD, Ave of 3, 200 C., % | 26% | 25% | 17% | 11% | 19% | 15% |
| Observations (aftrer annealing step) | | | | Developed holes | | |
| ρ RT, Ωcm | 1178 | 3067 | 34545 | 43835 | 2323 | 46970 |
| ρ 70 C., Ωcm | 1057 | 6065 | 16902 | 23730 | 1910 | 13578 |
| ρ 105 C., Ωcm | 943 | 4686 | 9214 | 14710 | 1270 | 13445 |

Example 5

Referring to Table 5 below, there are shown, by composition and performance, a number of comparative samples that lacked an electrolyte swellable thermoplastic. As can be seen, Samples 5A and 5C exhibited very high resistivity. Sample 5B, which included a considerable percentage of silica, exhibited a more acceptable resistivity; however, this sample was brittle and lacked film integrity. As a result, Sample 5B may not be optimal as a monolayer separator but may be more suitable as part of a multi-layer separator, perhaps with a polyolefin layer as a carrier layer that provides structural strength.

TABLE 5

| Sample ID | 5A | 5B | 5C |
|---|---|---|---|
| Composition (v %) | | | |
| COC | 33% | 29% | 68% |
| FX5911 | 0% | 0% | 0% |
| Polyox | 0% | 0% | 0% |
| Mineral spirits | 67% | 57% | 27% |
| Silica | 0% | 14% | 5% |
| Total | 100% | 100% | 100% |
| Processing method | Solvent cast | Solvent cast | Extrusion cast |
| Sample appearance | Homogeneous, but non-porous | Granular | Homogeneous |
| Strength and elasticity | Elastic with mineral spirits, but non-elastic after removing mineral spirits | Brittle and not elastic | Fragile and not elastic |
| Physical testing | | | |
| IPA wet-out penetration | No | Yes | No |
| Initial sample weight (gm) | 0.299 | 0.415 | 0.034 |
| 5 days RT electrolyte weight change % | 17% | 38% | 53% |
| 2 hr 70° C. electrolyte weight change % | 11% | 6% | 88% |
| Sample Resistivity after RT storage, Ohm-cm | 39,600 | 9,500 | 342,100 |
| Sample Resistivity after 70° C. storage, Ohm-cm | 23,500 | 7,000 | 199,800 |

What is claimed is:

1. A microporous sheet product made by a method comprising (a) forming a mixture of (i) at least one cyclic olefin copolymer, (ii) an electrolyte swellable thermoplastic polymer, wherein the electrolyte swellable thermoplastic polymer is at least one member selected from the group consisting of polyoxyethylene, polypropylene oxide, hydroxypropyl cellulose, hydroxypropyl methyl cellulose, and a fluorocarbon terpolymer, and (iii) a compatibilizing agent that promotes mixing of the at least one cyclic olefin copolymer and the electrolyte swellable thermoplastic polymer, wherein the compatibilizing agent is a liquid hydrocarbon, the compatibilizing agent having a boiling point in the range of 135-300° C.; (b) casting the mixture to form a sheet material; and (c) cooling the sheet material, wherein the at least one cyclic olefin copolymer forms a continuous phase of the microporous sheet product and the electrolyte swellable thermoplastic polymer forms a discontinuous phase of the microporous sheet product, and wherein the microporous sheet product is free of polyethylene and polypropylene.

2. The microporous sheet product as claimed in claim 1 wherein the at least one cyclic olefin copolymer comprises an ethylene-norbornene cyclic olefin copolymer.

3. The microporous sheet product as claimed in claim 1 wherein the at least one cyclic olefin copolymer has a glass transition temperature of about 70-180° C.

4. The microporous sheet product as claimed in claim 3 wherein the at least one cyclic olefin copolymer has a glass transition temperature above 90° C.

5. The microporous sheet product as claimed in claim 4 wherein the at least one cyclic olefin copolymer has a glass transition temperature above 110° C.

6. The microporous sheet product as claimed in claim 5 wherein the at least one cyclic olefin copolymer has a glass transition temperature above 130° C.

7. The microporous sheet product as claimed in claim 1 wherein the at least one cyclic olefin copolymer has a glass transition temperature of 180° C., a heat deflection temperature of 170° C., a melt temperature of 270-320° C., and a volumetric flow index of 1.5 ml/10 min, tested at 260° C. and 2.16 kg load.

8. The microporous sheet product as claimed in claim 1 wherein the at least one cyclic olefin copolymer has a molecular weight below 100,000 Da.

9. The microporous sheet product as claimed in claim 8 wherein the at least one cyclic olefin copolymer has a molecular weight below 60,000 Da.

10. The microporous sheet product as claimed in claim 9 wherein the at least one cyclic olefin copolymer has a molecular weight below 30,000 Da.

11. The microporous sheet product as claimed in claim 1 wherein the at least one cyclic olefin copolymer constitutes about 10-70% by volume of the mixture.

12. The microporous sheet product as claimed in claim 1 wherein the electrolyte swellable thermoplastic polymer includes at least one electronegative atom that promotes swelling when exposed to a suitable electrolyte.

13. The microporous sheet product as claimed in claim 1 wherein the electrolyte swellable thermoplastic polymer is at least one member selected from the group consisting of polyoxyethylene and polyvinylidene fluoride-hexafluoropropylene-tetrafluoroethylene.

14. The microporous sheet product as claimed in claim 1 wherein the electrolyte swellable thermoplastic polymer has a molecular weight above 30,000 Da.

15. The microporous sheet product as claimed in claim 14 wherein the electrolyte swellable thermoplastic polymer has a molecular weight above 60,000 Da.

16. The microporous sheet product as claimed in claim 15 wherein the electrolyte swellable thermoplastic polymer has a molecular weight above 100,000 Da.

17. The microporous sheet product as claimed in claim 1 wherein the electrolyte swellable thermoplastic polymer has a higher molecular weight and a higher melt viscosity than the at least one cyclic olefin copolymer.

18. The microporous sheet product as claimed in claim 1 wherein the electrolyte swellable thermoplastic polymer constitutes about 5-70% by volume of the mixture.

19. The microporous sheet product as claimed in claim 1 wherein the compatibilizing agent has a boiling point in the range of about 170-250° C.

20. The microporous sheet product as claimed in claim 19 wherein the compatibilizing agent has a flash point characteristic within the range of about 30-170° C.

21. The microporous sheet product as claimed in claim 1 wherein the compatibilizing agent is a mixture of liquid hydrocarbons whose individual components have boiling points than span over a breadth of at least 10° C.

22. The microporous sheet product as claimed in claim 21 wherein the compatibilizing agent is a mixture of liquid hydrocarbons whose individual components have boiling points than span over a breadth of at least 15° C.

23. The microporous sheet product as claimed in claim 22 wherein the compatibilizing agent is a mixture of liquid hydrocarbons whose individual components have boiling points than span over a breadth of at least 20° C.

24. The microporous sheet product as claimed in claim 1 wherein the compatibilizing agent comprises mineral spirits.

25. The microporous sheet product as claimed in claim 1 wherein the compatibilizing agent constitutes about 10-90% by volume of the mixture.

26. The microporous sheet product as claimed in claim 1 wherein the at least one cyclic olefin polymer constitutes about 10-70% by volume of the mixture, wherein the electrolyte swellable thermoplastic polymer constitutes about 5-70% by volume of the mixture, and wherein the compatibilizing agent constitutes about 10-90% by volume of the mixture.

27. The microporous sheet product as claimed in claim 1 wherein the mixture further comprises at least one of an inorganic filler and a cross-linked polyacrylate polymer.

28. The microporous sheet product as claimed in claim 1 wherein the method further comprises removing the compatibilizing agent from the sheet material.

29. The microporous sheet product as claimed in claim 28 wherein the step of removing the compatibilizing agent comprises stretching the sheet material.

30. The microporous sheet product as claimed in claim 1 wherein the method further comprises stretching the sheet material.

31. The microporous sheet product as claimed in claim 1 wherein the microporous sheet product has a resistivity below 10,000 ohm-cm as tested in $LiPF_6$ electrolyte and below 300 as tested in a 30% KOH solution.

32. The microporous sheet product as claimed in claim 31 wherein the microporous sheet product has a resistivity below about 3000 ohm-cm as tested in $LiPF_6$ electrolyte.

33. The microporous sheet product as claimed in claim 1 wherein the microporous sheet product has an average pore size below 5 microns.

34. The microporous sheet product as claimed in claim 1 wherein the mixture is an extrusion mixture and wherein the casting step comprises extruding the extrusion mixture to form the sheet material.

35. The microporous sheet product as claimed in claim 1 wherein the mixture is a homogeneous solution and wherein the casting step comprises coating the homogeneous solution on a substrate using a solvent cast technique.

36. The microporous sheet product as claimed in claim 35 wherein the substrate is a polyolefin film and wherein at least a portion of the homogeneous solution at least partially penetrates the polyolefin film.

37. A multilayer sheet product, the multilayer sheet product comprising a plurality of stacked layers, wherein at least one of the stacked layers is the microporous sheet product of claim 1.

38. The microporous sheet product as claimed in claim 1 wherein the mixture further comprises an inorganic filler.

39. The microporous sheet product as claimed in claim 1 wherein the mixture further comprises polyisobutylene.

40. The microporous sheet product as claimed in claim 1 wherein the fluorocarbon terpolymer comprises a combination of three members of the group consisting of polyvinylidene fluoride, hexafluoral propylene, tetrafluoral ethylene, and chloro-trifluoral ethylene.

41. A method of separating the electrodes of a battery, the method comprising positioning the microporous sheet product of claim 1 between the electrodes.

42. A method of packaging a food item, the method comprising contacting the food item with the microporous sheet product of claim 1.

43. A microporous sheet product made by a method comprising (a) dissolving at least one cyclic olefin copolymer and an electrolyte swellable thermoplastic polymer in a compatibilizing agent to form a homogeneous solution, wherein the electrolyte swellable thermoplastic polymer is at least one member selected from the group consisting of polyoxyethylene, polypropylene oxide, hydroxypropyl cellulose, hydroxypropyl methyl cellulose, and a fluorocarbon terpolymer and wherein the compatibilizing agent is a liquid hydrocarbon; and (b) forming a sheet material with the homogeneous solution using a solvent cast technique, wherein the at least one cyclic olefin copolymer forms a continuous phase of the microporous sheet product and the electrolyte swellable thermoplastic polymer forms a discontinuous phase of the microporous sheet product, and wherein the microporous sheet product is free of polyethylene and polypropylene.

44. A microporous sheet product made by a method comprising (a) forming a mixture of (i) at least one cyclic olefin polymer, (ii) an electrolyte swellable thermoplastic polymer, wherein the electrolyte swellable thermoplastic polymer is at least one member selected from the group consisting of polyoxyethylene, polypropylene oxide, hydroxypropyl cellulose, hydroxypropyl methyl cellulose, and a fluorocarbon terpolymer, and (iii) a compatibilizing agent that promotes mixing of the at least one cyclic olefin polymer and the electrolyte swellable thermoplastic polymer, wherein the compatibilizing agent is a liquid hydrocarbon, the compatibilizing agent having a boiling point in the range of 135-300° C.; (b) casting the mixture to form a sheet material; and (c) cooling the sheet material, wherein the at least one cyclic olefin polymer forms a continuous phase of the microporous sheet product and the electrolyte swellable thermoplastic polymer forms a discontinuous phase of the microporous sheet product, and wherein the microporous sheet product is free of polyethylene and polypropylene.

45. A method of making a microporous sheet product, the method comprising the steps of:
   (a) melt-extruding an extrusion mixture to produce a sheet material, the extrusion mixture comprising (i) at least one cyclic olefin copolymer, (ii) an electrolyte swellable thermoplastic polymer, wherein the electrolyte swellable thermoplastic polymer is at least one member selected from the group consisting of polyoxyethylene, polypropylene oxide, hydroxypropyl cellulose, hydroxypropyl methyl cellulose, and a fluorocarbon terpolymer, and (iii) a compatibilizing agent that promotes mixing of the at least one cyclic olefin copolymer and the electrolyte swellable thermoplastic polymer, wherein the compatibilizing agent is a liquid hydrocarbon, the compatibilizing agent having a boiling point in the range of 135-300° C.,
   (b) then, cooling the sheet material, whereby micropores are formed in the sheet material, and
   (c) then, subjecting the sheet material to a stretching/vaporizing step, whereby at least a portion of the compatibilizing agent is removed from the sheet material, wherein the at least one cyclic olefin copolymer forms a continuous phase of the microporous sheet product and the electrolyte swellable thermoplastic polymer forms a discontinuous phase of the microporous sheet product, and wherein the microporous sheet product is free of polyethylene and polypropylene.

\* \* \* \* \*